(12) United States Patent
McCormick

(10) Patent No.: US 7,039,632 B2
(45) Date of Patent: May 2, 2006

(54) SYSTEM AND METHOD FOR MANAGING A MANUFACTURING PROCESS OPERATION

(75) Inventor: Kevin Lee McCormick, Fremont, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 219 days.

(21) Appl. No.: 10/243,630

(22) Filed: Sep. 13, 2002

(65) Prior Publication Data

US 2004/0054660 A1 Mar. 18, 2004

(51) Int. Cl.
*G06F 17/30* (2006.01)

(52) U.S. Cl. .............................. 707/3; 707/200; 700/19; 700/29

(58) Field of Classification Search .................... 707/3, 707/200; 700/121, 217, 106, 19, 29, 97, 700/108; 345/742; 264/40.1; 430/5; 438/7; 705/11; 709/221; 716/4
See application file for complete search history.

(56) References Cited

U.S. PATENT DOCUMENTS

| | | | |
|---|---|---|---|
| 4,739,366 A | | 4/1988 | Braswell et al. .............. 399/10 |
| 5,518,671 A | * | 5/1996 | Takizawa et al. .......... 264/40.1 |
| 5,691,895 A | * | 11/1997 | Kurtzberg et al. ............ 700/29 |
| 6,221,538 B1 | * | 4/2001 | Kerszykowski et al. ........ 430/5 |
| 6,263,255 B1 | * | 7/2001 | Tan et al. .................... 700/121 |
| 6,505,094 B1 | * | 1/2003 | Pape et al. .................. 700/217 |
| 6,625,769 B1 | * | 9/2003 | Huott et al. ................. 714/733 |
| 2002/0059003 A1 | * | 5/2002 | Ruth et al. ..................... 700/19 |
| 2002/0067370 A1 | * | 6/2002 | Forney et al. .............. 345/742 |
| 2002/0077718 A1 | * | 6/2002 | Harburda et al. ........... 700/106 |
| 2002/0129310 A1 | * | 9/2002 | Shin ........................... 714/727 |
| 2002/0133133 A1 | * | 9/2002 | Agyapong et al. ...... 604/385.01 |
| 2002/0188495 A1 | * | 12/2002 | Banerjee et al. .............. 705/10 |
| 2002/0198971 A1 | * | 12/2002 | Resnick et al. ............. 709/221 |

FOREIGN PATENT DOCUMENTS

| | | |
|---|---|---|
| JP | 8-252746 A | 1/1996 |
| JP | 08252746 A * | 10/1996 |
| WO | WO 01/02919 A1 | 1/2001 |
| WO | WO 200102919 A1 * | 1/2001 |

* cited by examiner

Primary Examiner—Luke S Wassum
Assistant Examiner—Gwen Liang
(74) Attorney, Agent, or Firm—Senniger Powers

(57) ABSTRACT

A system and method for managing a manufacturing processing operation by integrating one or more data retrieval systems with a user station. Data stored on one or more data retrieval systems is communicatively interfaced with the user station. The user stations controls one or more manufacturing processing operation in a manufacturing environment. The interfaced data is displayed on the user station to assist an operator that monitors or controls the user station in making changes in the manufacturing processing operation.

55 Claims, 9 Drawing Sheets

FIG. 6

| | | | | | | | |
|---|---|---|---|---|---|---|---|
| CK | FORWARD | DETAIL | HISTORY | MOVIE | | | |

| CHARACTERISTIC | DET | INF | TGT | CAP | CON | REL | MINS UNTI |
|---|---|---|---|---|---|---|---|
| APPLICATOR ACCEPTANCE | -a- | • | | | | • | 5 MINS |
| APPLICATOR CONTROL | -a- | • | | | | | 5 MINS |
| CARTON ACCEPTANCE | -a- | • | | | | • | 5 MINS |
| CARTON CONTROL | -a- | • | | | | | 5 MINS |
| CASE ACCEPTANCE | -a- | • | | 606 | 610 | • | 5 MINS |
| CASE CONTROL | -a- | • | 602 | | | | 5 MINS |
| FDA ABSORBENCY | | • | • | • | • | • | OVERDUE |
| PLEDGET WEIGHT | | • | → | ↑ | ↗ | × | 23 MINS |
| PLEDGET ACCEPTANCE | -a- | • | | | | • | 5 MINS |
| PLEDGET CONTROL | -a- | • | 604 | | 608 | | 5 MINS |

SYSTEM AND METHOD FOR MANAGING A MANUFACTURING PROCESS OPERATION

FIELD OF THE INVENTION

The present invention relates to a system and method for managing a manufacturing processing operation. In particular, this invention relates to a system and method for the integrated management of a manufacturing processing operation by employing data retrieval systems that are responsive to the manufacturing processing operation to assist an operator in making a change in the manufacturing processing operation.

BACKGROUND OF THE INVENTION

In the past, process operators (operators) in a manufacturing environment have needed access to procedures and checklists to insure safe and efficient operations. These operators are required to know important aspects of process performance such as process readings, product quality information, waste and delay rates, and measurements of raw material properties. Moreover, the operators need to know when to do preventative housekeeping and maintenance, and when to take process readings and make finished-product measurements.

When problems arise, access to diagnostic information can help them quickly identify the causes and lead them through corrective actions. Corrective actions are often process adjustments that may affect other aspects of process performance, so easy access to cause and effect relationships can help prevent inadvertent negative consequences. Process adjustments can have related safety issues, so access to safety information can prevent injuries.

Operators need access to historical process performance information so that they can identify trends in process performance. They need answers to five fundamental quality-control questions: Is there enough information to make an adequate assessment of current process performance? Is the process running to target? Is the process variability at the level we expect? Is there any evidence of a recent change in process behavior? Is the process quality good enough to allow the product to be released for shipment?

The invention described below addresses one or more of these and other disadvantages and needs.

SUMMARY OF THE INVENTION

The invention meets the above needs and overcomes the deficiencies of the prior art by providing system and method for the integrated management of a manufacturing processing operation that employs relational databases and associated software to increase operator efficiency. The system and method reduces product variability problems associated with a manufacturing processing operation, by capturing, manipulating, and displaying product and process information to assist operators in identifying and correcting quality issues associated with the manufacturing processing operation.

In accordance with one aspect of the invention, a method provides for managing a manufacturing processing operation. The method includes storing process data that relates to the manufacturing processing operation. The method further includes storing manufacturing reference information that relates to the manufacturing processing operation. The method further includes selectively retrieving the stored process data, and analyzing the retrieved process data to provide a graphical display that depicts a real-time estimate of the process performance of the manufacturing processing operation. The method also includes defining a query based on the graphical display to selectively retrieve the stored manufacturing reference information. The method further includes executing the query to provide a reference display of the manufacturing reference information, and using the displayed reference information to assist the operator in making a change to the processing operation.

In accordance with yet another aspect of the invention, an integrated manufacturing system provides for capturing, manipulating, and displaying process data of a manufacturing processing operation. The system includes a manufacturing data resource (MDR) database for storing process data that relates to the manufacturing processing operation. The system further includes a module for retrieving the process data from the MDR database. The system further includes a satellite database for storing manufacturing reference information that relates to the manufacturing processing operation. The system also includes an interface application that is responsive to queries to selectively retrieve the manufacturing reference information from the satellite database. The system further includes a viewer application for analyzing the process data retrieved by the module to determine a real-time estimate of a process performance of the manufacturing processing operation. The viewer application also arranges the manufacturing reference information retrieved by interface application and/or the analyzed process data for viewing. The system further includes a user station for executing the viewer application. The user station provides a graphical display that depicts the real-time estimate of the process performance as determined by the viewer application. The user station also includes a query tool that responds to user input to provide the queries to the interface application. The user station further provides a reference display of the manufacturing reference information that has been arranged by the viewer application in response to the queries. The user station allows a user controlling the manufacturing processing operation to use the query tool to generate a query to selectively retrieve the manufacturing reference information stored in the satellite database. Alternatively, the process data retrieved from the MDR database determines whether the module automatically employs the query tool to generate a query to selectively retrieve the manufacturing reference information that is stored in the satellite database. The user uses the selectively retrieved manufacturing reference information to assist the user in making a change to the manufacturing processing operation based on the real-time estimate of the process performance that is provided by the graphical display.

In accordance with yet another aspect of the invention, an integrated manufacturing system provides for capturing, manipulating, and displaying process data of a manufacturing processing operation. The system includes an MDR retrieval system for selectively retrieving process data that relates to the manufacturing processing operation. The system further includes a satellite application for selectively retrieving manufacturing reference information that relates to the manufacturing processing operation. The system further includes a user station that provides a graphical display that depicts a real-time estimate of the process performance of the manufacturing processing operation. The user station includes a query tool that provides queries to the satellite application. The user station further provides a reference display of the manufacturing reference information retrieved via the satellite application in response to the queries. The user uses the query tool to generate a query and execute the satellite application to selectively retrieve the manufacturing reference information. The user then uses the selectively retrieved manufacturing reference information to assist the user in making a change to the manufacturing processing operation based on the real-time estimate of the process performance that is provided by the graphical display.

BRIEF DESCRIPTION OF DRAWINGS

FIG. 6 is a screen shot illustrating a graphic evaluation of a characteristic with respect to a five-question set.

DETAILED DESCRIPTION

Figure 1:
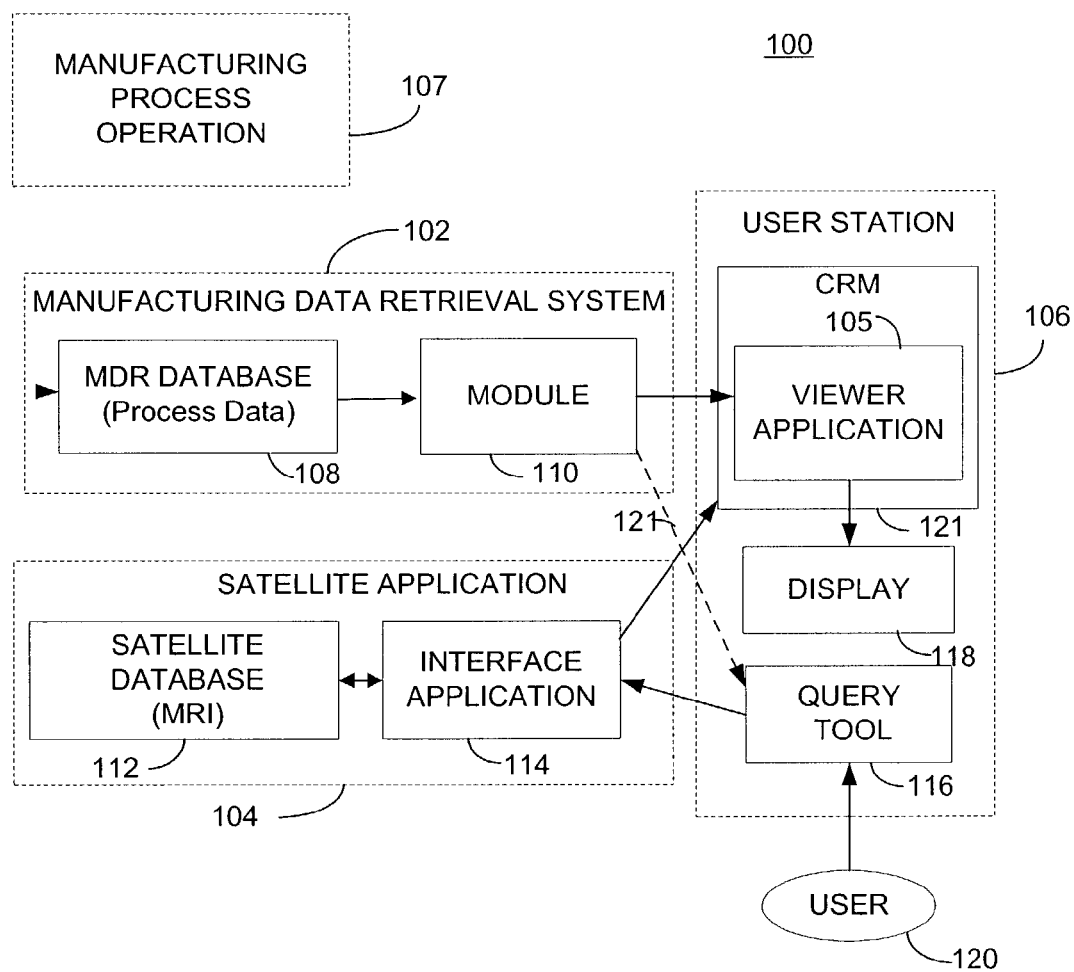
FIG. 1 is an exemplary block diagram illustrating a system and method according to a preferred embodiment of the invention including integration between a manufacturing data resource, a satellite application, a viewer application and a user station.

Referring first to FIG. 1, an exemplary block diagram illustrates an integration between a manufacturing data retrieval system 102, a satellite application 104, a viewer application 105, a user station 106, and one or more manufacturing processing operations (MPO)s 107 according to a system 100 of the invention.

The manufacturing data retrieval system 102 includes a manufacturing data resource (MDR) database 108 and a module 110. The MDR database 108 stores processing data for one or more MPOs 107. For example, and as described below in reference to FIG. 3, the MDR database 108 may include process or product data that relates to product quality, process settings, waste, process delays, or raw materials attributes. In one embodiment, the MDR database 108 is maintained by systems external to the invention. For example, the MDR database 108 may be maintained by a server that manages a network of local computers of a particular operation area of a manufacturing plant.

A module 110 for accessing MDR database 108 includes an executable routine designed to retrieve specific process data from the MDR database 108. For example, the module 110 may be a dynamic-link library file storing a data retrieval program written in a structured query language (SQL). In this instance, the module 110 is specifically designed to retrieve data from the type of MDR database 108 being accessed. Thus, when the system 100 retrieves process data from more than one type MDR database 108, a corresponding number of modules 110 are required. For example, to retrieve process data from an MDR database 108 that is located on a particular system, the module 110 is configured to retrieve the appropriate data from the particular system in the correct configuration.

The satellite application 104 employs a satellite database 112, and an interface application 114. The satellite database 112 stores manufacturing reference information (MRI) that relates to one or more MPOs 107 or related processing operations. For example, and as described below in reference to FIG. 4, the satellite database 112 may include process or product reference information that relates problem solving, occupational safety, folklore, process control plans, process allocation, resources and reports. In one embodiment, the satellite database 112 is an SQL-driven relational database such as MICROSOFT ACCESS®, MICROSOFT® SQL Server™, SYBASE® SQL SERVER™, or ORACLE®. In such an embodiment, individual reference information records contained in the satellite database 112 can be accessed and modified by users. In another embodiment (not shown), a table stores additional manufacturing reference information that is used to update the manufacturing reference information stored in the satellite database 112 after approval. In such an embodiment, the user 120 can access the table and modify the stored information. Thus, if user 120 accesses the table and finds incorrect information, the user 120 can enter corrections before the information is approved so that the satellite database 112 is not updated with the incorrect information.

The interface application 114 may be a program stored on a computer readable medium that is responsive to queries for selectively retrieving manufacturing reference information from the satellite database 112. The interface application 114 provides querying functionality that is specific to the satellite database 112. Thus, when the manufacturing reference information is stored in more than one satellite database 112, a corresponding number of interface applications 114 are required. The interface application 114 supports queries that involve straight full-record searches as well as keyword searches. In one embodiment, the interface application 114 supports an "internet-search-engine" querying functionality.

In one embodiment, the viewer application 105 is the nucleus of the system 100. By executing the viewer application, the user 120 can retrieve and analyze processing data for one or more MPOs 107 to create a "window on the process." For example, the viewer application 105 communicates with the MDR database 108 via module 110 to retrieve information that is in turn processed into common interpretative displays. In one embodiment, and as described in more detail below in reference to FIG. 5, the viewer application 105 arranges the information that it retrieves from the MDRs in a multi-tier arrangement similar to the folder structure used in MICROSOFT WINDOWS®.

The user station 106 includes a computer readable medium (CRM) 121 that stores the viewer application 105. The user station 106 is linked to the manufacturing data retrieval system 102 and the satellite application 104. The manufacturing data retrieval system 102 selectively retrieves and provides process data relating to one or more manufacturing processing operations to the user station 106. The satellite application 104 selectively retrieves and provides manufacturing reference information relating to the one or more processing operations to the user station 106. When executed, the viewer application 105 analyzes the received process data, and arranges the manufacturing reference information and the analyzed process data for viewing. In one embodiment, the user station 106 may be a personal computer (PC) system communicatively linked with the MPO 107. In this instance, the user station 106 provides a query tool 116 and a display 118.

The user 120 uses the query tool 116 of the user station 106 to generate a query. The query tool 116 then provides the generated query to the interface application 114. In one embodiment, and as described below in reference to FIG. 2, the user 120 uses an input device such as a computer keyboard to provide a query request to a querying generating application of the query tool 116. In another embodiment, the query tool 116 is linked via arrow 121 with the module 110 such that the query is automatically generated in response to the process data retrieved from the MDR database 108. For example, module 110 may be configured to analyze the process data retrieved from the MDR database 108 and automatically provide a query request, as indicated by arrow 121, to the query generating application when the process data violates expected parameters.

In one exemplary embodiment, the display 118 is a computer monitor associated with a PC system (i.e., user station 106) communicatively linked to the MPO 107. The display 118 is linked to the viewer application 105 such that the user 120 can view a display of a real-time estimate of the process performance for the MPO 107 based on the processing data retrieved from the MDR database 108 by module 110. Alternatively or in addition, the user 120 can view a display of the MRI based on the MRI selectively retrieved from satellite database 112 by the interface application 114. The display 118 further provides a plurality of graphical and reference displays to assist the user 120 in making changes that improve the performance of the processing operation. The graphics are generated by software code written specifically for and contained in the viewer application 105.

Figure 1A:
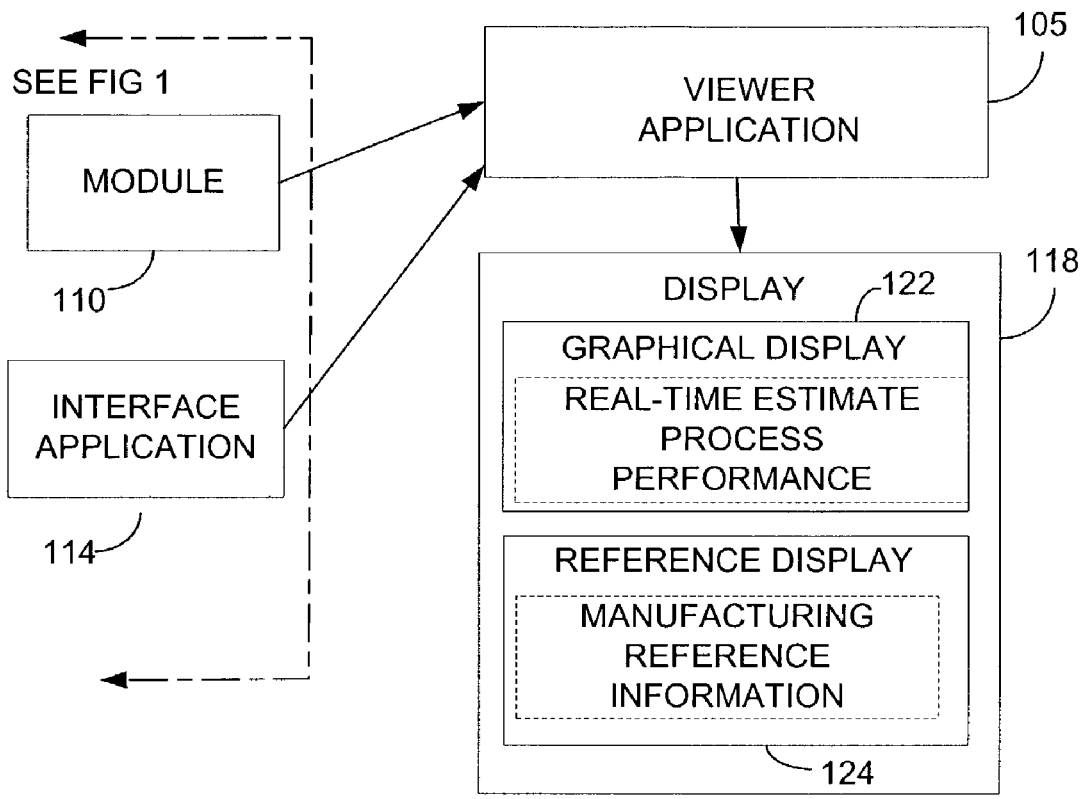
FIG. 1A is an exemplary block diagram illustrating the components of the display of FIG. 1.

Referring to FIG. 1A, an exemplary block diagram illustrates the components of a display 118. The display 118 includes a graphical display 122 and a reference display 124. The graphical display 122 displays the real-time estimate of the process performance for the MPOs 107 based on the process data selectively retrieved from the MDR database 108 by module 110. The reference display 124 displays the manufacturing reference information selectively retrieved from the satellite database 112 in response to the query generated by user 120.

In operation, the user 120 is an operator involved in controlling and/or monitoring the MPOs 107. Each MPO 107 is linked to one or more MDR databases 108 such that processing data can be continuously accessed and/or monitored. Independent of the MDR databases 108, the satellite database 112 is constantly updated with manufacturing reference information such that operators can access information relating to safety, efficiency, and productivity within the manufacturing plant. As described above, the user station 106 is communicatively linked to the MPO 107 via the MDR system 102 such that the viewer application 105 analyzes the processing data retrieved by module 110 from the MDR databases 108 and generates a real-time estimate of the process performance of the MPOs 107. The viewer application 105 further arranges the generated real-time estimate of the process performance for the MPOs 107 for viewing on the graphical display 122. The user 120 frequently reviews the graphical display 122 provided by display 118 to monitor the performance of the MPO 107. When a problem is observed or anticipated, the user 120 uses the input device (e.g., computer keyboard) to request a query that will return manufacturing reference information regarding the particular problem. The input device is linked to a query generating application for constructing the query. The query application then submits the query to the interface application 114. The interface application 114 executes the query and retrieves the appropriate reference information. The interface application 114 is linked to the viewer application 105. The viewer application 105 arranges the requested manufacturing reference information such that the user 120 can view it on the reference display 124 and compare and contrast it to the graphical display 122.

Figure 2:
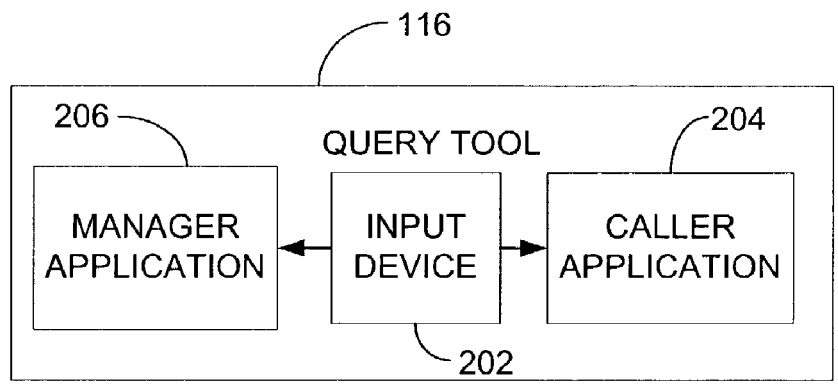
FIG. 2 is an exemplary block diagram illustrating the components of the query tool of FIG. 1.

Referring next to FIG. 2, an exemplary block diagram illustrates the components of the query tool 116. The query tool 116 provides the querying functionality that allows the manufacturing reference information stored in the satellite database 112 to be retrieved, modified, deleted and/or updated. In this embodiment, the query tool 116 includes an input device 202, a caller application 204, and a manager application 206.

The input device 202 is, for example, a computer keyboard associated with the PC system linked to the MPOs 107. In this instance, the user 120 uses the input device 202 to enter keystrokes and request a query based on identified operational issues. For example, after viewing process data, such as provided by the graphic display 122 described with reference to FIG. 1A, the user 120 uses the input device 202 to request a query that will retrieve reference information relevant to operational issues that are identified after viewing the graphical display 122.

The caller application 204 allows the user 120 to request a query. The caller application 204 is linked to the input device 202 and interface application 114. In this instance, the caller application 204 receives information from the input device 202. Based on the input received (e.g., keystrokes) from the input device 202, the caller application 204 generates the query and provides the query to the interface application 114. The interface application constructs the specific query string, executes the query, and provides the results of the executed query to the display 118 for viewing by the user 120.

The manager application 206 is a stand-alone program that is used for managing the satellite database 112 (i.e., data entry, deletion, and editing). The manager application 206 is linked to the input device 202 to receive input from authorized users attempting to add, modify, and/or delete specific manufacturing reference information stored in the satellite database 112. In one embodiment, any user can execute the manager application 206. In another embodiment, only authorized users can execute the manager application 206. In such an embodiment, after receiving input from the input device 202, the manager application 206 confirms that the user is an authorized user by verifying user authorization levels and/or passwords. If the user 120 is an authorized user, the manager application 206 uses the input received from the input device 202 to generate instructions to add, modify, and/or delete manufacturing reference information stored in the satellite database 112. The manager application 206 then provides the generated instructions to the interface application 114. The interface application 114 executes the instructions to add to, modify and/or delete specific manufacturing reference information stored in the satellite database 112.

Figure 3:
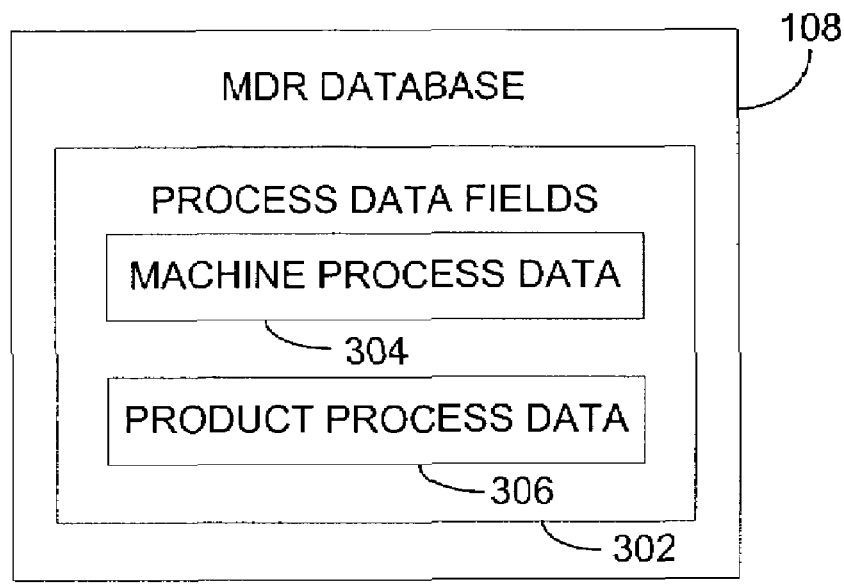
FIG. 3 is an exemplary block diagram illustrating the contents of MDR database of FIG. 1.

Referring next to FIG. 3, an exemplary block diagram illustrates the contents of an MDR database 108 stored on a computer readable medium. As described above, the MDR database 108 stores processing data relating to one or more processing operations in a process data field 302. The process data field 302 contains process data 304 and/or product data 306. The process data 304 and product data 306 include process characteristics and product characteristics, respectively. As used herein, the term characteristic refers to a measurable aspect or attribute of a process or product.

In this exemplary embodiment, there are five MDR databases including: a product quality database; a process settings database; a waste database; a delay database; and a raw material attributes database. The product quality database stores characteristic data such as product weight, length, and absorbency. The process settings database stores characteristic data such as pressure, temperature, speed, tension. The waste database stores characteristic data such as cull count. The delay database stores characteristic data such as process down time. The raw material attributes database stores characteristic data such roll width, fabric porosity, opacity.

Each characteristic has a target value, a lower limit value, an upper limit value, an attribute or variable status, and a sampling frequency. In one embodiment, the characteristic data is collected from the manufacturing processing operation at predetermined intervals and time-stamped. As described with reference to FIGS. 8 and 9, time-stamping the characteristic data provides the user 120 the ability to view the performance of the MPO 107 chronologically in history and/or movie views on display 118. In another embodiment, the characteristic element data is collected at the request of the user 120, and time-stamped.

Figure 4:
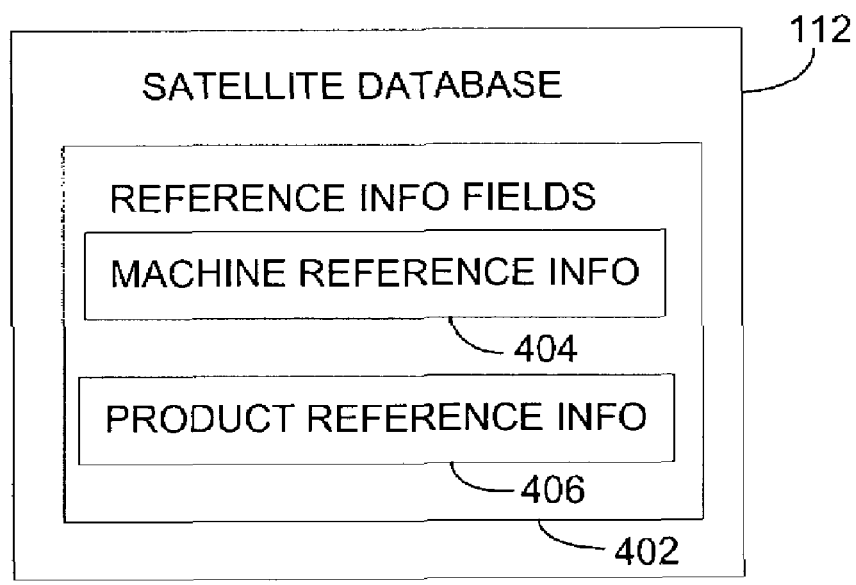
FIG. 4 is an exemplary block diagram illustrating the contents of a satellite database of FIG. 1

Referring next to FIG. 4, an exemplary block diagram illustrates the contents of a satellite database 112. The satellite database 112 stores manufacturing reference information that relates to one or more processing operations in a reference information field 402. The reference information field 402 contains process reference information 404 and/or product reference information 406. As used herein, "reference information" refers to any information that assists the user 120 to address product or process issues that arise or may arise during a processing operation.

In this instance, there are seven satellite databases including: a problem solving database; an occupational safety database; a folklore database; a process control plan database; a process allocation database; a resource database; and a reports database. The problem solving database stores manufacturing reference information such as process problems, symptoms of process problems, and solution steps for process problems. For example, using a device, such as query tool 116 described with reference to FIG. 2, a user 120 can generate a query to search the problem solving database 112 for all problems and related symptoms concerning "product weight." Thereafter, the user 120 may focus on a specific problem returned in the initial query and view a list of solution steps for solving that particular problem.

The occupational safety database stores manufacturing reference information such as safety-related procedures. This allows the user 120 to generate a query and retrieve specific safety procedures relating to a particular manufacturing processing operation. For example, a user 120 can generate a query to search all procedures related to making a specific machine adjustment.

The folklore database stores operator comments regarding best practices, poor practices, and general operating ideas. The folklore database is a freeform searchable database that contains information entered by operators. For example, a search engine using a keyword search that is similar to the freeform searches used to search the Internet may be used to search the folklore database.

The process control plan database stores manufacturing reference information such as operator-activity lists, frequency-of-execution, and who-should-do-it information.

For example, the process control plan database stores the following: grade change and/or startup procedures; process-setting checks; housekeeping activities; preventative maintenance activities; and product inspections to be performed. In one embodiment, the process control plan database contains a log regarding the execution of the activities on the operator-activity list. The log contains information such as time of execution, individual responsible for the task, and remarks pertinent to the activity.

The process allocation database stores qualitative cause-and-effect relationships. The "causes" in a process allocation exercise are process settings and raw material characteristics, and the "effects" are product quality, waste, and delay measures. A two-dimensional matrix can be constructed wherein each column represents a cause (grouped into process settings and raw materials characteristics) and wherein each row represents an effect. There is shown in Table 1 an exemplary two-dimensional matrix that identifies cause-and-effect relationships for tissue paper produced by a particular tissue machine, e.g., a tissue machine type 2 (TM2). The matrix is used to determine whether any relationship exists between six effects (i.e., quality issues) observed on the tissue paper, and ten potential causes. The columns C1–C10 relate to the potential causes of the observed effects. Columns C1–C6 identify causes that relate to process settings for particular aspects of the manufacturing process, and columns C7–C10 identify causes that relate to raw material characteristics. The effects or quality issues include consistency, color, basis weight, porosity, formation, and pH level. (See rows R1–R6, respectively). Thus, by examining rows R1–R6, cause-and-effect relationships can be extracted to determine what causes relate to a particular effect. For example, by examining row R2, it can be determined that the color of tissue paper produced by the TM2 can be affected by the conveyer, pulper, or chemical addition settings, or by the furnish or pigment characteristics (indicated by the x in columns C1, C2, C3, C5, C7 and C9). As another example, by examining rows R1 and R4 simultaneously, it can be determined that the consistency and porosity of the tissue paper produced by the TM2 can both be affected by the conveyer or pulper settings, or by the furnish characteristics (indicated by the x in columns C1, C2, and C7).

The result of a process allocation exercise is a matrix where each cell is either left blank or filled with an "x" to denote a relationship. This set of relationships is stored in the process allocation database. In this instance, the manager application 206 serves as the data-entry mechanism for entering the relationships into the satellite database 112. The interface application 114 retrieves the relationships as needed for use in the caller application 204.

TABLE 1

TWO-DIMENSIONAL MATRIX: TISSUE PRODUCED BY TM2

| EFFECTS | | C1 CONVEYER | C2 PULPER | C3 CHEMICAL ADDITION | C4 FIBERIZER | C5 REFINER | C6 FLOW CONTROL VALVE | C7 FURNISH | C8 SODA ASH | C9 PIGMENTS | C10 KYMENE |
|---|---|---|---|---|---|---|---|---|---|---|---|
| | | PROCESS SETTINGS | | | | | | RAW MATERIALS CHARACTERISTICS | | | |
| R1 | CONSISTENCY | X | X | | | | | X | | | |
| R2 | COLOR | X | X | X | | X | | X | | X | |
| R3 | BASIS WEIGHT | X | X | | | | | | | | |
| R4 | POROSITY | X | X | | X | X | X | X | | | X |
| R5 | FORMATION | X | X | | | | X | X | | | |
| R6 | PH | | | X | | | | X | | | |

The resources database stores individual contact information. For example, the resources database contains telephone numbers and/or e-mail addresses for individuals designated as experts in various aspects of the MPOs 107 or individuals that require notification when a specified event occurs. The interface application 114 retrieves the lists when requested by the caller application 204.

The reporting database stores queries designed for returning summary and detail reports for various types of process data collected over specific timeframes (e.g., shift reports, daily reports, monthly reports). The manager application 206 provides simplified query-design screens along with entry points for report timeframes, report frequencies, data source locations, etc. The interface application 114 allows the caller application 204 to request reports. In one embodiment, a query that retrieves information from both the MDR database 108 and the satellite database 112 is stored in the reporting database. This functionality allows for "composite" reports where product-quality information is reported along with process, productivity, and quality management information. In yet another embodiment, the reporting database also provides scheduling capability that allows a user 120 to designate when reports are generated. The reporting database further enables the operator to designate where the reports should be sent (e.g. to a specific printer, or to an EXCEL workbook).

Figure 5:
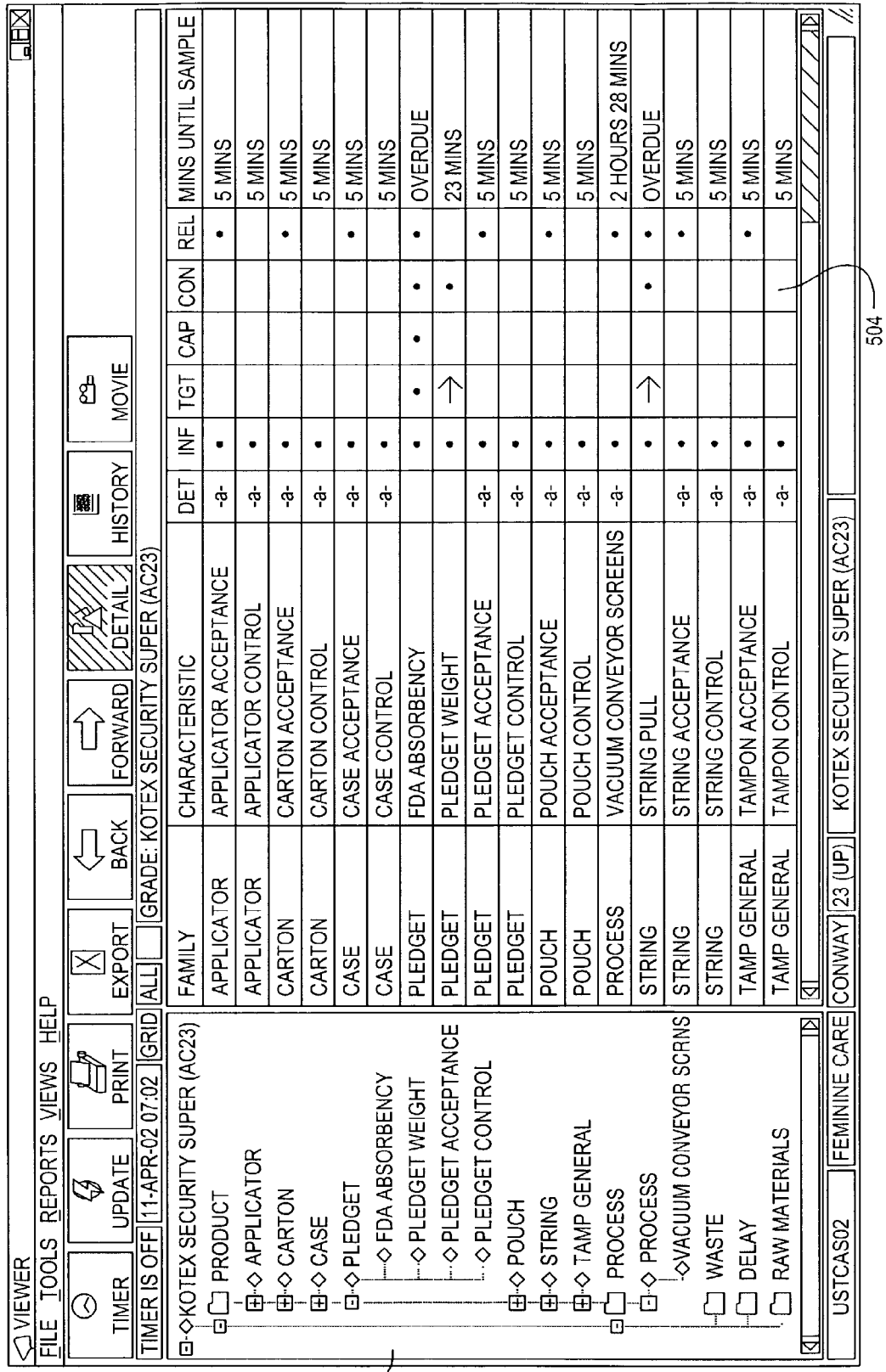
FIG. 5 is a screen shot illustrating an exemplary embodiment of a main view of the invention.

Referring next to FIG. 5, an exemplary main view 500 according to the invention is illustrated in the form of a screen shot. In this embodiment, and as discussed above with reference to FIG. 3, the display 118 connects to the various MDR databases 108, and displays process characteristic data 304 in the graphical display 122 in a hierarchical view 502 and a grid-style view 504.

The hierarchical view 502 arranges the process data retrieved from the MDR database 108 in a multi-level arrangement such as a folder structure used in an operating system such as MICROSOFT WINDOWS®. In this case, the top level is the grade level and represents a single product/machine combination. Within the grade level, there are five MDR levels representing each of the five MDR databases 108 as discussed in reference to FIG. 3. Within each MDR level, there are one or more family levels representing a group of characteristics such as product components and/or process section. Within each family level, there are one or more characteristic levels that represent measurable aspects of a product, raw material, process property, waste amount, or delay time. Examples of such measurable aspects include weight, length, temperature, pressure, yield, cull count, and downtime.

For example, in the screen shot illustrated in FIG. 5, KOTEX SECURITY Super (AC23) is the product/machine combination and identifies the grade level. The Product, Process, Waste, Delay, and Raw Material folders are within the KOTEX SECURITY Super (AC23) grade level and identify the different MDR levels. The Applicator, Carton, Case, Pledget are product components within the Product folder, and identify the different family levels. The FDA absorbency, Pledget Weight, Pledget Acceptance, and Pledget control are the measurable aspects within the pledget family and identify the characteristic levels.

The grid-style view 504 arranges the processing data in a tabular format. More specifically, in response to the user interaction with the hierarchical view 502 of the main view 500, the family level and characteristic level data is presented in a tabular format. In this exemplary embodiment, the user 120 opens (e.g., double clicks) a particular grade level to display its MDR levels. The user 120 then opens a particular MDR folder to display its family levels. Next, a particular family level is opened to display its characteristic levels. Each family level that appears in the hierarchical section of the main view 500 is also listed in a "Family" column, and each characteristic associated with that particular Family level is listed in a "Characteristics" column. The grid-style 504 view further provides five columns (INF, TGT, CAP, CON, REL) that correspond to five characteristic assessments (current information, at-target, variability, recent-change, fit-for-release, respectively).

In another embodiment, additional processing information such as process target, process limits, process average, standard deviation, sample size and the time until the next sample is due is also shown on the main view 500. For example, there is shown in FIG. 5 a column entitled "Mins Until Sample" which provides the time (in minutes) when the operator must collect sample data.

Referring next to FIG. 6, a screen shot illustrates the evaluation of a characteristic with respect to a five-question set. The viewer application 105 performs the evaluation of the characteristic and the display 118 presents the answers in a graphical display as shown in FIG. 6. When a question is inappropriate for a characteristic, the viewer application 105 grays-out the cell in the graphical display 122.

In this instance, the five questions are as follows: (1) is there enough current information to make an assessment regarding the particular characteristic? (2) is the characteristic at its target? (3) is the variability in the characteristic's data commensurate with expectations? (4) is there any evidence of a recent change in the characteristic's behavior? and (5) is the overall performance of the characteristic acceptable? For the purpose of this description, the above questions set will be referred to herein as a current information assessment, an at-target assessment, variability assessment, a recent change assessment, and a fit-for-release assessment, respectively.

A Current Information assessment cell 602 is located under the heading "INF" on the screen shot, and compares a measure of the amount of current data to a minimum threshold value. A current information assessment indicating insufficient information is illustrated by question mark in the cell.

An At-Target assessment cell 604 is located under the heading "TGT" on the screen shot, and is a statistical "T" test of the characteristic's average value versus the characteristic's target value. An arrow pointing left or right illustrates if the characteristic's average value is off target. For example, an arrow pointing left indicates the process is running below target, and an arrow pointing right indicates the process is running above target.

The Variability assessment cell 606 is located under the heading "CAP" on the screen shot, and is a statistical "Chi-Square" test of the characteristic's standard deviation value versus a "capability" number supplied by the MDR database 108. In this instance, the variability is illustrated by an arrow that points up or down. For example, if the variability is low the arrow points down, and if the variability is high the arrow points up.

The Recent-Change assessment cell 608 is located under the heading "CON," and is a statistical evaluation of the average and standard deviation values for the characteristic versus their corresponding recent-history behavior. This allows assessments to be made regarding recent changes in process behavior. An arrow pointing in one of the eight basic compass directions (N, NE, E, etc.) illustrates a recent change assessment.

The Fit-for-Release assessment cell 610 is located under the heading "REL," and is a comparison of an estimate of the portion of the current production that falls outside of the limits to a user-defined threshold. The variation in the characteristic may be modeled with a statistical "normal distribution." Under this assumption, a statistically-based estimate of the "percent defective," i.e. percentage in each tail of the distribution outside of the limits (e.g., specification limits) is calculated. If this estimate exceeds a threshold provided by the MDR database 108, then a bold, red "X" is displayed. In this instance, the fit-for-release assessment is only used for product characteristics. A not fit-for-release assessment is illustrated as a bold, red "X."

For example, still referring to FIG. 6, the Current Information assessment cell 602 does not contain a question mark, indicating that there is sufficient information to rely on the cells to its right and to make other assessments regarding pledget weight. The At-Target assessment cell 604 contains an arrow pointing right indicating that the pledget weight is above target. The Variability assessment cell 606 contains an arrow pointing up indicating the there is a high variability in the pledget weight. The Recent-Change assessment cell 608 contains an arrow that is pointing northeasterly indicating where this point would be located with respect the "control ellipse" on the EWMA (Exponentially-Weighted Moving Average) graphic as described in reference to FIG. 7 below. The Fit-for-Release assessment cell 610 contains an "X" indicating that the current production is not fit for release.

Figure 7:
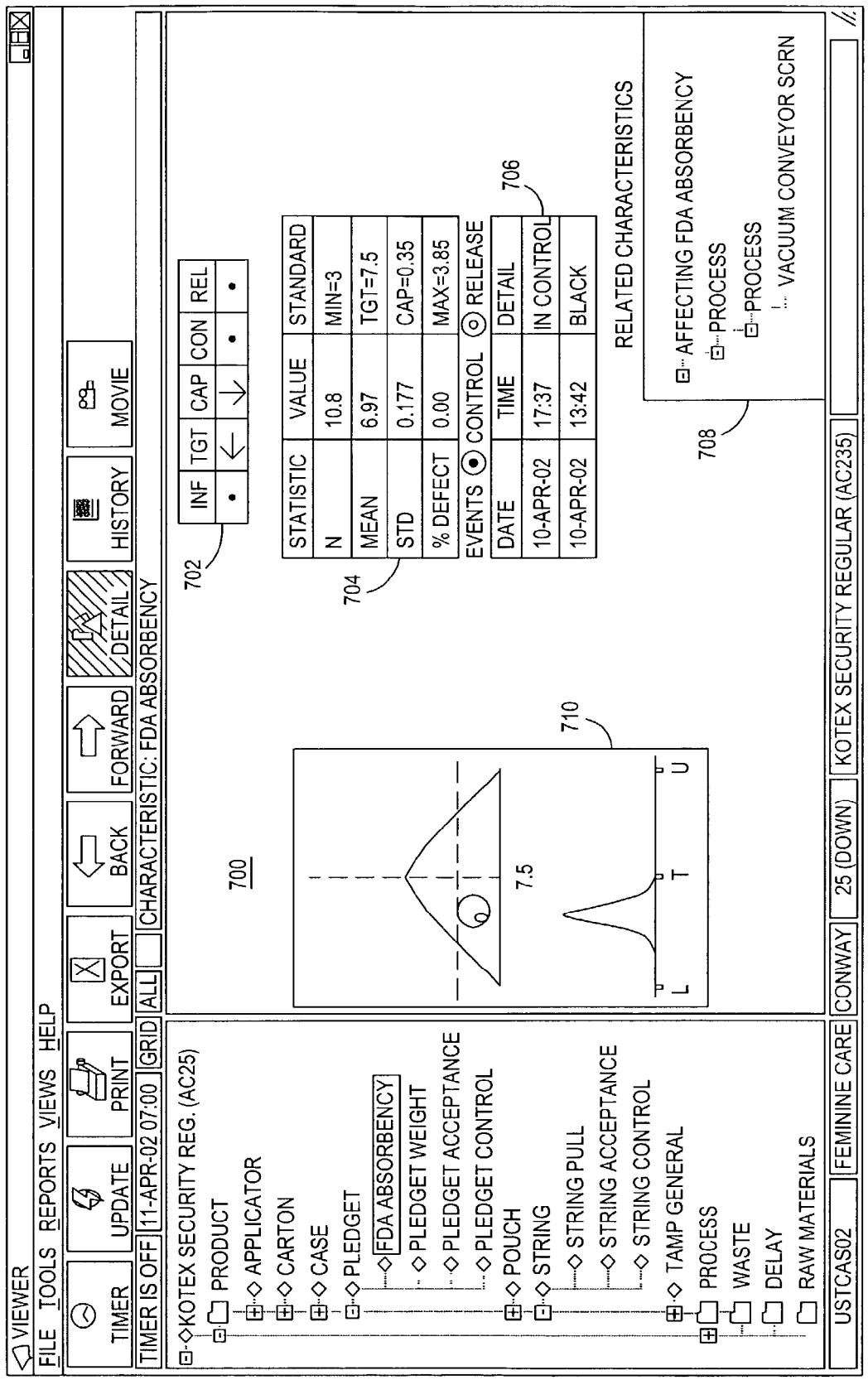
FIG. 7 is a screen shot illustrating an exemplary detail view of the invention.
Figure 8:
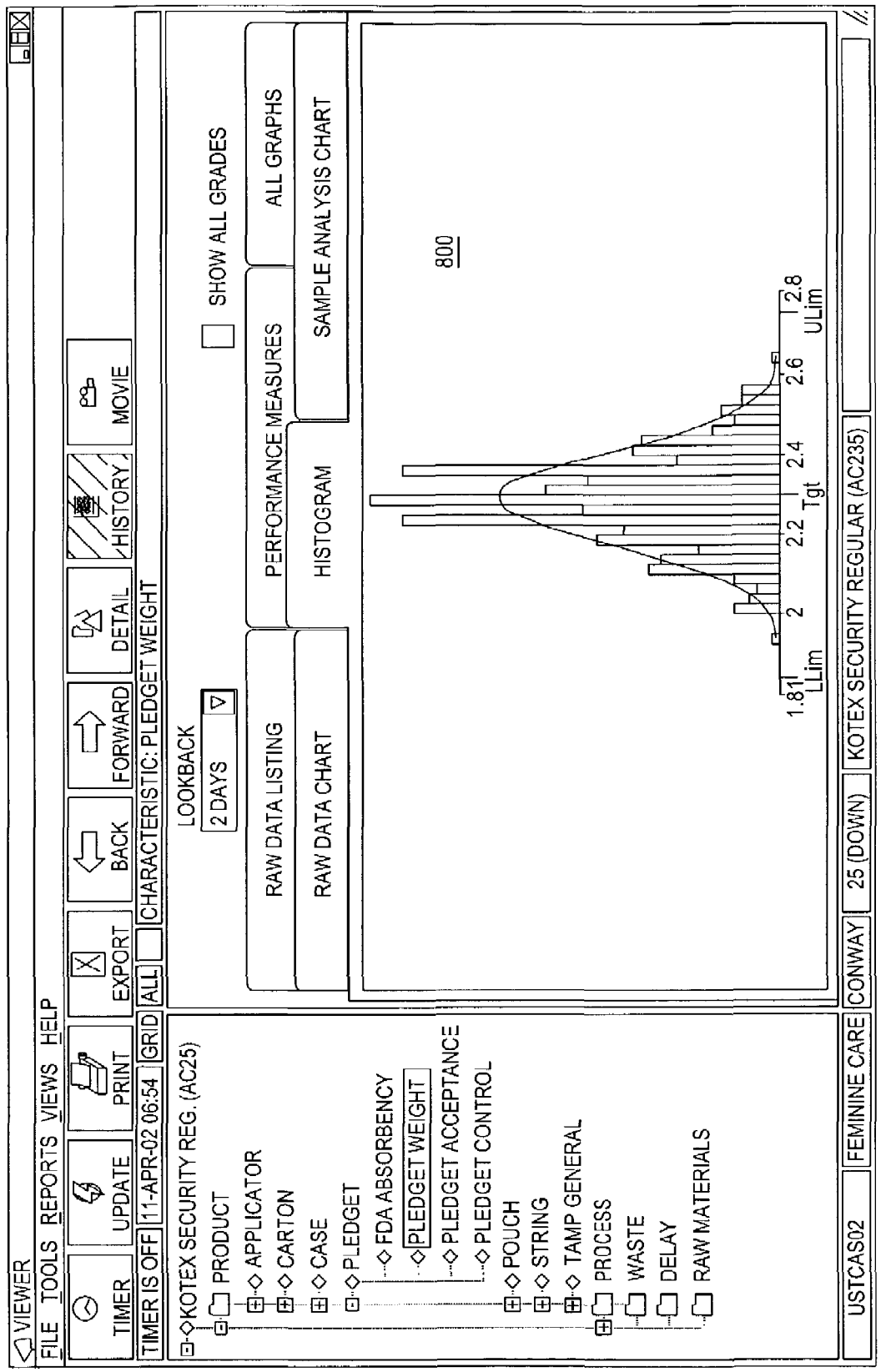
FIG. 8 is a screen shot illustrating an exemplary history view of the invention.
Figure 9:
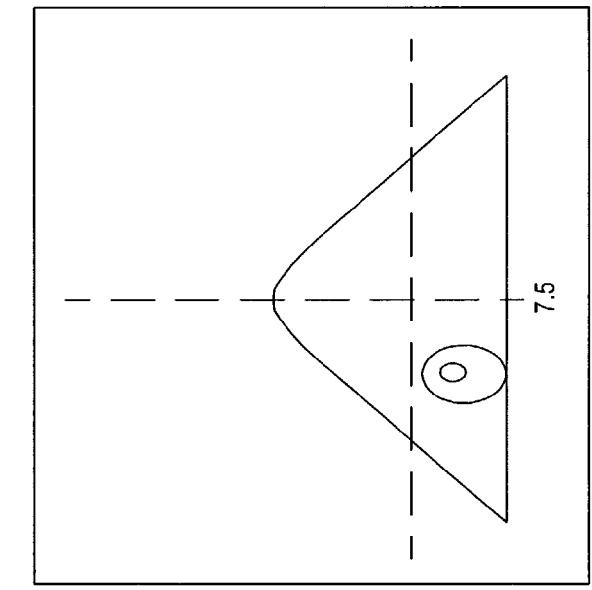
FIG. 9 is a screen shot illustrating an exemplary movie view of the invention.
Figure 9:
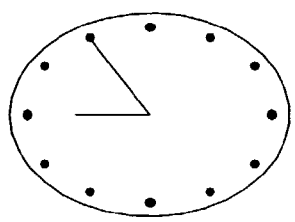
Figure 9:
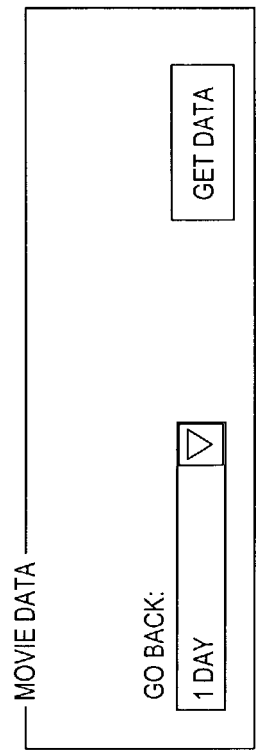

In addition to the main view 500, the performance of a particular characteristic may be displayed in a detail view, a history view, and a movie view as shown in FIGS. 7–9, respectively.

Referring next to FIG. 7, there is shown a screen shot illustrating an exemplary detail view 700 illustrating the current performance of a characteristic. A variety of displays of the detailed view 700 include: the five-question display 702; a process variable/standard display 704; an events display 706; a related characteristics display 708; and a plot display 710.

The five-question display 702 is an evaluation of the particular characteristic with respect to the five-question set as described in reference to FIG. 6. In this instance, the five-question display appears near the top of the screen shot.

The process variable/standard display 704 shows (in a center column) values for process variables values such as sample size (n), mean, standard deviation (std), and percent outside limits (% Defect), and their respective standard values (in a right column). In this embodiment, when a line item is significantly off its standard, in relation to the five-questions assessment, it is highlighted in red.

The events display 706 displays information relating to control and release (where appropriate). When the "Control" option is selected, the events display 706 shows all recent events recorded by the MDR database 108 regarding four of the five questions: INF. TGT, CAP, and CON. When the "Release" option is selected, the events display 706 shows all recent events recorded by the MDR database 108 regarding two of the five questions: INF, and REL.

The related characteristics display 708 lists characteristics that are identified in process allocation cause-and-effect relationships. In this instance, the related characteristic information is provided by the link between the viewer application 105 and the MDR database 108 that stores process allocation data (i.e., process allocation database). When the user 120 clicks on one of the listed related characteristics, the graphical display 122 displays a detailed view for that characteristic.

In this exemplary embodiment, the plot display 710 shows an EWMA graphic and a bell-curve to assist a user 120 in analyzing the performance of the characteristic.

The EWMA graphic is a diagram that displays the current performance level for a characteristic. The EWMA graphic is an XY plot of standard deviation on the vertical axis plotted versus average on the horizontal axis. The vertical dotted line represents the target for the characteristic, and the horizontal line represents the expected level for the standard deviation. The point represents the current mean and standard deviation. The ellipse equates to statistical control limits. When the point moves outside the ellipse, this indicates a change in the behavior of the characteristic. The interior of the triangular shape corresponds to an area in which the point can be located to maintain the estimated percent defective less than a specified value. When the point moves outside the triangle, the characteristic is deemed not fit for release.

A bell-shaped curve appears below the EWMA graphic. The bell curve illustrates the distribution of a set of processing values for a particular characteristic. The horizontal axis is the scale for the processing values, and the vertical axis represents the frequency of the particular processing values. For example, the bell curve illustrates where the distribution for FDA absorbency falls with respect to the corresponding target and limits values.

In another embodiment (not shown), a third plot display that appears below the bell curve shows plus-and-minus-three-sigma bounds (equivalent to the left and right edges of the bell curve) for each of the tracks in a multi-track characteristic. A "multi-track characteristic" is best described with an example. When facial tissue paper is manufactured, it is initially produced in a long roll (e.g., 63 inches) that is dissected into shorter rolls (e.g., seven rolls of 9 inches each). From a manufacturing perspective, it is as if seven manufacturing processes are running in parallel. A sample pulled from this process representing a single moment in time is a collection of seven numbers—one for each position across the long roll. This is a multi-track characteristic with seven "tracks."

Referring next to FIG. 8, there is shown a screen shot illustrating an exemplary history view 800 which provides a perspective of the historical performance of a characteristic. More specifically, a user 120 is provided with the ability to view the historical performance of a particular characteristic over a user defined period by selecting from a plurality of graphical or tabular displays (raw data graph, a histogram, sample analysis graph, raw data table, performance tables, etc.).

For example, still referring to FIG. 8, a histogram illustrates the historical performance of the pledget weight characteristic. The histogram includes a vertical bar chart and a distribution curve. The bar chart and distribution curve share common vertical and horizontal axes. The horizontal axis refers to pledget weight, and the vertical axis refers to the frequency of a particular pledget weight. The vertical bar chart shows the frequency of the pledget weight in various equal-width bars along the horizontal axis. A taller bar indicates that the corresponding pledget weight is more frequent than the pledget weight that corresponds to a shorter bar. The distribution curve is a smoothed out frequency polygon and shows the pledget weight distribution in a bell shaped curve.

In this case, the histogram illustrated in FIG. 8 shows a pledget weight distribution that ranges between 2 grams and approximately 2.58 grams. The histogram also shows that the target weight was the most frequent weight over the specified two-day period.

Referring next to FIG. 9, a screen shot illustrates an exemplary movie view 900. The movie view 900 provides a collection of graphical illustrations that allows a user 120 to selectively view the performance of the particular characteristic over a specified time interval. In such an embodiment, the user 120 selects a time period over which to collect the graphics. The viewer application 105 reconstructs the estimates of all of the quantities that make up the EWMA Graphic based on historical data supplied by the MDR database 108 and produces the corresponding pictures. Manipulation of the horizontal scroll bar beneath the graphic display cycles through the sequence of pictures as desired. Accordingly, the user 120 can scroll through the collection of graphics so that they appear in near continuous motion.

Further, the movie view 900 displays a date and time that corresponds with each graphic illustration. This allows the user 120 to quickly identify dates and times of processing issues.

Figure 10:
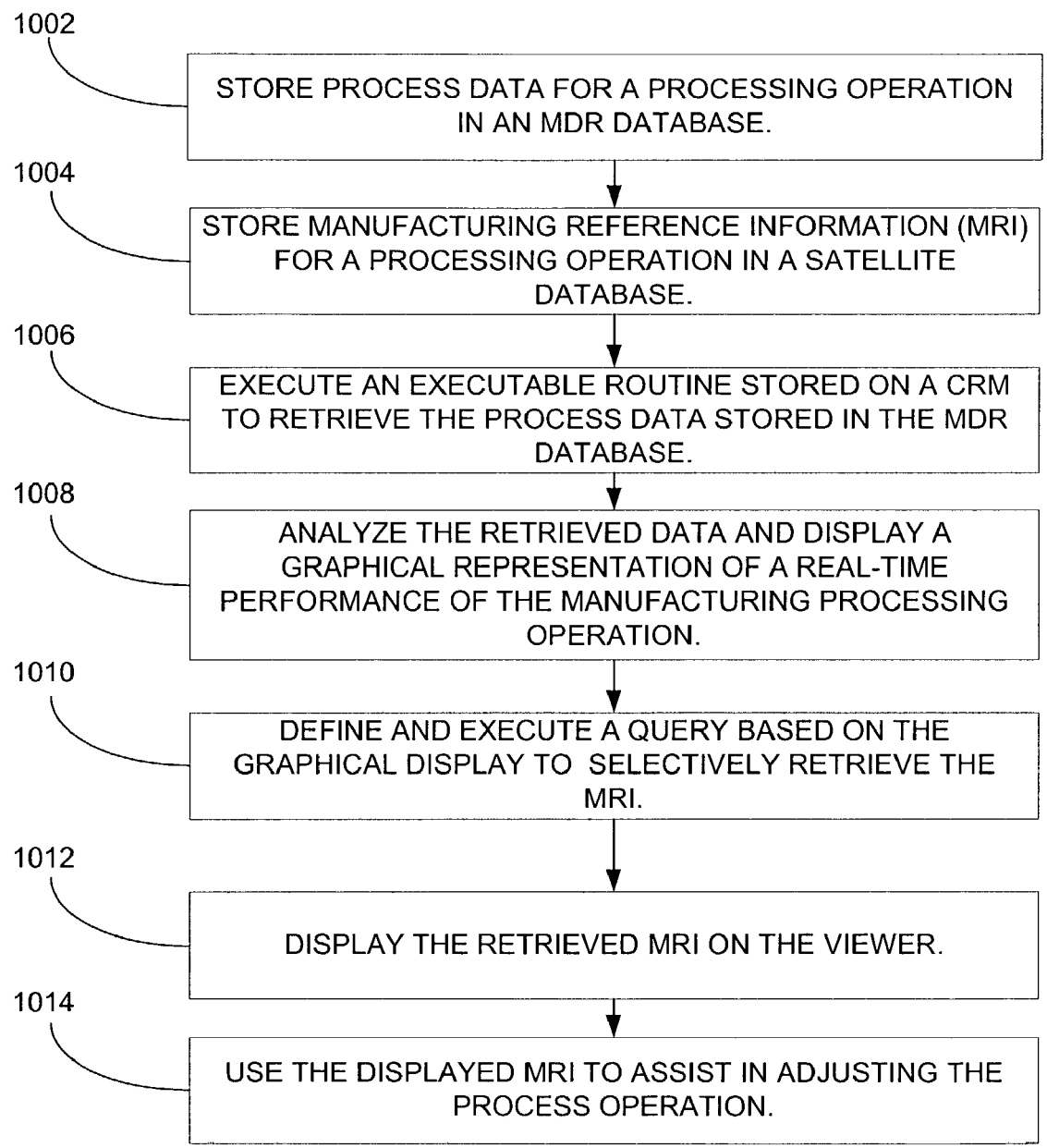
FIG. 10 is an exemplary flow chart illustrating a method for managing a manufacturing processing operation according to one preferred embodiment of the invention.

Referring now to FIG. 10, an exemplary flow chart illustrates a method for managing a manufacturing processing operation according to one preferred embodiment of the invention.

In this instance, process data for the processing operation is stored in MDR database 108 at step 1002. At step 1004, manufacturing reference information (MRI) for the processing operation is stored in satellite database 112. An executable routine that is stored on a computer readable medium is executed to selectively retrieve the stored process data at step 1006. At step 1008, a graphical representation of a real-time performance of the processing operation is displayed on display 118. Based on the graphical representation of the real-time performance, a user 120 defines and executes a query to selectively retrieve the stored MRI at step 1010. At step 1012, the selectively retrieved MRI is displayed on viewer 118. The user 120 uses the displayed reference information to assist in making a change to the processing operation at step 1014.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

The invention claimed is:

1. A computerized method of communicatively interfacing data for managing a manufacturing processing operation in a manufacturing environment, the computerized method comprising the steps of:

storing process data in manufacturing data resource (MDR) databases of a computer including a product quality database, said process data relating to the manufacturing processing operation;

storing manufacturing reference information relating to the manufacturing processing operation;

selectively retrieving the stored process data;

analyzing the retrieved process data and providing a graphical display that depicts a real-time estimate of a process performance of the manufacturing processing operation;

automatically defining a query based on the graphical display to selectively retrieve the stored manufacturing reference information including information regarding problem solving for process or product issues that arise during the manufacturing processing operation based on the real-time estimate of the process performance;

executing the query and providing a reference display of the manufacturing reference information including said problem solving information;

displaying the process data retrieved from an MDR database in hierarchically organized levels; said hierarchically organized levels including:

a top level for identifying a product/machine combination of the manufacturing processing operation;

a first sub-level for identifying one or more MDR databases corresponding to the product/machine combination identified in the top level;

a second sub-level for identifying product components and/or machine sections of the manufacturing processing operation; and a third sub-level for identifying product attributes and/or machine variables of the manufacturing processing operation; and selectively using the provided reference display to adjust the manufacturing processing operation.

2. The method of claim 1, wherein the MDR databases further include one or more of the following:

a process settings database;

a waste database;

a delay database; and a raw material attribute database.

3. The method of claim 2, wherein the process data is selectively retrieved from one or more MDR databases at predetermined time intervals.

4. The method of claim 1, wherein the top level is a grade level for identifying a product/machine combination of the manufacturing processing operational, the first sub-level is an MDR folder level for identifying a plurality of MDR databases, the second sub-level is a family level for identifying product components and/or machine sections of the manufacturing processing operation, and the third sub-level is a characteristic level for identifying product attributes and/or machine variables of the manufacturing processing operation.

5. The method of claim 4, wherein the real-time estimate of the process performance of the manufacturing processing operation is determined from one or more of the following assessments of characteristic level data:
   a current information assessment;
   an at target assessment;
   a variability assessment;
   a recent change assessment; and
   a fit for release assessment.

6. The method of claim 5, wherein the real-time estimate of a process performance of the manufacturing processing operation is depicted on the graphical display by a universally recognizable symbol, and wherein the universally recognizable symbol is a function of the characteristic level data assessment.

7. The method of claim 1, wherein the process data is stored in a local PC and/or network.

8. The method of claim 1, wherein the manufacturing reference information is stored in a local PC and/or network.

9. The method of claim 1, wherein the manufacturing reference information is stored in satellite databases.

10. The method of claim 9, wherein the satellite databases include one or more of the following databases: a process problem solving database, a occupational safety database, an operator observations database, a process allocations database, a process control plans database, a process experts database, and a reports database.

11. The method of claim 1, wherein a user defines the query.

12. The method of claim 1 further including the step of executing a manager application for modifying, deleting and/or adding to the manufacturing reference information stored in the satellite database.

13. The method of claim 1, wherein the stored process data relating to the manufacturing processing operation includes time-stamp data indicating the date and time the corresponding process data was collected from the manufacturing processing operation.

14. The method of claim 1, wherein providing a graphical display that depicts a real-time estimate of a process performance of the manufacturing processing operation includes providing a detailed view, a history view, and/or a movie view.

15. An integrated manufacturing system having a computer readable medium having one or more applications executed by the system for capturing, manipulating, and displaying process data of a manufacturing processing operation, the system comprising:
   a manufacturing data resource (MDR) database storing process data relating to the manufacturing processing operation, said MDR database including a product quality database;
   a module for retrieving the process data from the MDR database;
   a satellite database for storing manufacturing reference information relating to the manufacturing processing operation, wherein the manufacturing reference information includes information regarding problem solving for process or product issues that arise during the manufacturing process operation;
   an interface application responsive to queries for selectively retrieving the manufacturing reference information from the satellite database;
   a viewer application for analyzing the process data retrieved by the module to determine a real-time estimate of a process performance of the manufacturing processing operation, and arranging the manufacturing reference information retrieved by the interface application and/or the analyzed process data for viewing as a function of the real-time estimate of the process performance;
   a user station executing the viewer application and providing a graphical display that depicts the real-time estimate of the process performance determined by the viewer application and displays the retrieved process data in hierarchically organized levels, said hierarchically organized levels including:
      a top level for identifying a product machine combination of the manufacturing processing operation;
      a first sub-level for identifying one or more MDR databases corresponding to the product/machine combination identified in the top level;
      a second sub-level for identifying product components and/or machine sections of the manufacturing processing operation; and
      a third sub-level for identifying product attributes and/or machine variables of the manufacturing processing operation;
   said user station comprising a query tool responsive to user input providing queries to the interface application, the user station providing a reference display of the manufacturing reference information including said problem solving information arranged by the viewer application in response to the queries whereby a user controlling the manufacturing processing operation employs the query tool to automatically generate a query to selectively retrieve the manufacturing reference information stored in the satellite database to assist the user in making a change to the manufacturing processing operation based on the real-time estimate of the process performance provided by the graphical display.

16. The system of claim 15, wherein the the top level is a grade level for identifying a product/machine combination of the manufacturing processing operation, the first sub-level is an MDR folder level for identifying a plurality of MDR databases, the second sub-level is a family level for identifying product components and/or machine sections of the manufacturing processing operation, and the third sub-level is a characteristic level for identifying product attributes and/or machine variables of the manufacturing processing operation.

17. The system of claim 16, wherein the grade level is the uppermost level in the hierarchically organized format, and wherein the MDR folder level is a sub-level of the grade level, and wherein the family level is a sub-level of the MDR folder level, and wherein the characteristic level is a sub-level of the family level.

18. The system of claim 16, wherein the graphical display comprises a graphical representation of characteristic level processing data relating to the manufacturing processing operation or relating to a product of the manufacturing processing operation.

19. The system of claim 18, wherein the user station provides a graphical representation of the characteristic level process data in a detailed view, a history view, and/or a movie view.

20. The system of claim 19, wherein the movie view provided by the user station allows a user to selectively view a collection of graphical illustrations representing a performance of the particular characteristic over a specified time interval.

21. The system of claim 19, wherein the history view provided by the user station provides a graphical and/or textual illustration of a previous performance of the characteristic during a specified time interval.

22. The system of claim 19, wherein the detailed view provided by the user station indicates whether there is sufficient data to assess a performance of a particular characteristic, and wherein the detailed view illustrates the performance of the particular characteristic if there is sufficient data.

23. The system of claim 22, wherein the detailed view provided by the user station further illustrates one or more characteristics that are correlated to the particular characteristic.

24. The system of claim 22, wherein the performance of the particular characteristic provided by the viewer application is determined by one or more of the following characteristic level process data assessments;
  a current information assessment;
  an at target assessment;
  a variability assessment;
  a recent change assessment; and
  a fit for release assessment.

25. The system of claim 24, wherein the user station provides a universally recognizable symbol indicating the performance of the particular characteristic, and wherein the universally recognizable symbol is a function of a characteristic level process data assessment.

26. The system of claim 15, wherein the processing data stored in the MDR database includes time-stamp data indicating the date and time the process data was collected from the manufacturing processing operation.

27. The system of claim 15 including an additional MDR database, each storing characteristic level data relating to one or more additional manufacturing processing operations.

28. The system of claim 27, wherein the product quality database stores characteristic level data, said characteristic level data including at least one of product weight, product length and product absorbency of a product manufactured by the manufacturing processing operation.

29. The system of claim 28, wherein the product is a composite article including an absorbent material.

30. The system of claim 27, wherein one of the MDR databases is a process setting database for storing characteristic level data, said characteristic level data including at least one of process pressure, process temperature, process speed, and process tension of a product manufactured by the manufacturing processing operation.

31. The system of claim 27, wherein one of the MDR databases is a waste database for storing characteristic level data, said characteristic level data including at least one of cull count of a product manufactured by the manufacturing processing operation.

32. The system of claim 27, wherein one of the MDR databases is a delay database storing characteristic level data, said characteristic level data including at least one of processing operation downtime of a product manufactured by the manufacturing processing operation.

33. The system of claim 27, wherein one of the MDR databases is a raw materials attribute database storing characteristic level data, said characteristic level data including at least one of roll width, fabric porosity, and opacity of a product manufactured by the manufacturing processing operation.

34. The system of claim 27, including an additional module, each module specifically configured for retrieving process data from one of the MDR databases such that one module correlates to each MDR database.

35. The system of claim 15, wherein the module retrieves process data stored in the MDR database at predetermined time intervals.

36. The system of claim 35, wherein the module is an executable routine stored on a computer readable medium.

37. The system of claim 35, wherein the module is a dynamic-link library file (i.e. DLL).

38. The system of claim 15, wherein the query tool comprises an output device that is linked to a caller application and/or a manager application.

39. The system of claim 38, wherein the caller application is responsive to the output device for defining the query used by the interface application to selectively retrieve the manufacturing reference information from the satellite database.

40. The system of claim 38, wherein the manager application allows an authorized user to add, modify and/or delete information in the satellite database.

41. The system of claim 15, wherein the interface application is a program stored on a computer readable medium.

42. The system of claim 15 including an additional satellite database, each staring reference information for one or more additional processing operations.

43. The system of claim 42, wherein one of the satellite databases is a problem solving database for storing reference information, said reference information including at least one of process problems, problem symptoms, and solution steps associated with the manufacturing processing operation.

44. The system of claim 42, wherein one of the satellite databases is an occupational safety database storing reference information, said reference information including at least one of safety related procedures associated with the manufacturing processing operation.

45. The system of claim 42, wherein one of the satellite databases is a folklore database storing reference information, said reference information including at least one of operator observations associated with the manufacturing processing operation.

46. The system of claim 42, wherein one of the satellite databases is a process control plan database storing reference information, said reference information including at least one of processing activity lists, activity execution intervals, and activity owners associated with the manufacturing processing operation.

47. The system of claim 42, wherein one of the satellite databases is a process allocation database storing reference information, said reference information including at least one of roll width, fabric porosity, and opacity associated with the manufacturing processing operation.

48. The system of claim 42, one of the satellite databases is a resource database storing reference information, said reference information including at least one of the names and addresses of one or more process experts associated with the manufacturing processing operations.

49. The system of claim 42, wherein one of the satellite databases is a reporting database storing reference information, said reference information including at least one of product quantities, product quality and process reading associated with the manufacturing processing operations.

50. An integrated manufacturing system having a computer readable medium having one or more applications executed by the system for capturing, manipulating, and displaying process data of a manufacturing processing operation, the system comprising:
 a manufacturing data resource (MDR) database storing process data relating to the manufacturing processing operation, said MDR database including a product quality database;
 a module for retrieving the process data from the MDR database;
 a satellite database for storing manufacturing reference information relating to problem solving for process or product issues that arise during the manufacturing processing operation;
 an interface application responsive to queries for selectively retrieving the manufacturing reference information from the satellite database;
 a viewer application for analyzing the retrieved process data by the module to determine a real-time estimate of a process performance of the manufacturing processing operation, and for arranging the manufacturing reference information retrieved by the interface application and/or the analyzed process data for viewing;
 a user station executing the viewer application and providing a graphical display that depicts the real-time estimate of the process performance determined by the viewer application and that displays the process data retrieved in hierarchically organized levels, said hierarchically organized levels including:
  a grade level for identifying a product/machine combination of the manufacturing processing operation;
  an MDR folder level for identifying a plurality of MDR databases;
  a family level for identifying product components and/or machine sections of the manufacturing processing operation; and
  a characteristic level for identifying product attributes and/or machine variables of the manufacturing processing operation;
 said user station comprising a query tool responsive to user input providing the queries to the interface application, the user station providing a reference display of the manufacturing reference information arranged by the viewer application in response to queries whereby the process data retrieved from the MDR database determines whether the module employs the query tool to automatically generate a query to selectively retrieve the manufacturing reference information stored in the satellite database to assist a user in making a change to the manufacturing processing operation based on the real-time estimate of the process performance provided by the graphical display.

51. An integrated manufacturing system having a computer readable medium having one or more applications executed by the system for capturing, manipulating, and displaying process data of a manufacturing processing operation, the system comprising:
 a manufacturing data resource (MDR) retrieval system for selectively retrieving process data relating to the manufacturing processing operation, said MDR retrieval system including a product quality database;
 a satellite application for selectively retrieving manufacturing reference information relating to the manufacturing processing operation, said manufacturing reference information including information regarding problem solving for process or product issues that arise during the manufacturing process operation; and
 a user station for providing a graphical display that depicts a real-time estimate of a process performance of the manufacturing processing operation and that displays the retrieved process data in hierarchically organized levels, said hierarchically organized levels including:
  a grade level for identifying a product/machine combination of the manufacturing processing operation;
  an MDR folder level for identifying a plurality of MDR databases;
  a family level for identifying product components and/or machine sections of the manufacturing processing operation; and
  a characteristic level for identifying product attributes and/or machine variables of the manufacturing processing operation;
 said user station comprising a query tool providing queries to the satellite application, the user station providing a reference display of the manufacturing reference information in response to the queries whereby a user employs the query tool to automatically generate a query and execute the satellite application to selectively retrieve the manufacturing reference information to assist the user in making a change to the manufacturing processing operation based on the real-time estimate of a process performance provided by the graphical display.

52. The system of claim 51, wherein the manufacturing data resource (MDR) retrieval system comprises:
 a manufacturing data resource (MDR) database storing process data relating to the manufacturing processing operation; and
 a module for retrieving the process data from the MDR database.

53. The system of claim 51, wherein the satellite application comprises:
 a satellite database for storing manufacturing reference information; and
 an interface application responsive to queries for selectively retrieving the manufacturing reference information from the satellite database.

54. The system of claim 51, wherein the user station includes a viewer application stored on a computer readable medium.

55. The system of claim 54, wherein executing the viewer application analyzes the process data retrieved by the MDR retrieval system to determine the real-time estimate of a process performance of the manufacturing processing operation, and arranges the retrieved manufacturing reference information and/or the analyzed process data for viewing.

* * * * *

UNITED STATES PATENT AND TRADEMARK OFFICE
CERTIFICATE OF CORRECTION

PATENT NO.          : 7,039,632 B2  
APPLICATION NO. : 10/243630  
DATED                  : May 2, 2006  
INVENTOR(S)        : McCormick Page 1 of 1

It is certified that error appears in the above-identified patent and that said Letters Patent is hereby corrected as shown below:

Column 15, claim 4, line 7: "operational," should read -- operation, --.

Column 16, claim 15, line 27: "product machine" should read -- product/machine --.

Column 18, claim 42, line 39: "staring" should read -- storing --.

Signed and Sealed this

Twenty-eighth Day of August, 2007

JON W. DUDAS  
*Director of the United States Patent and Trademark Office*